Figure 2:
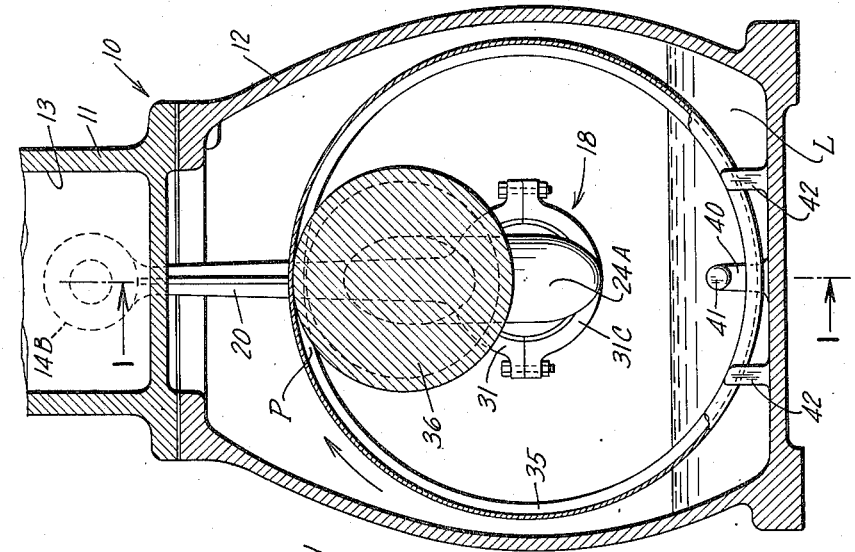

Feb. 6, 1951     W. P. DALRYMPLE     2,540,103
LUBRICATING SYSTEM
Filed Jan. 23, 1948

*INVENTOR.*
WILLIAM P. DALRYMPLE
BY
*Wallace and Cannon*
ATTORNEYS

Patented Feb. 6, 1951

2,540,103

UNITED STATES PATENT OFFICE 2,540,103

LUBRICATING SYSTEM

William P. Dalrymple, Rochester, N. Y., assignor to American Brake Shoe Company, Wilmington, Del., a corporation of Delaware Application January 23, 1948, Serial No. 4,001

4 Claims. (Cl. 184—11)

This invention relates to lubricating systems and particularly to lubricating systems for supplying lubricant to the bearing surfaces of piston rods that are used to associate the pistons and the crank shaft of piston and cylinder devices such as pumps, engines, compressors and the like.

In various kinds of piston and cylinder devices such as pumps, compressors, engines and the like, the problem of affording sufficient and effective lubrication for the bearings of the piston rods has been quite difficult of solution, and many attempts have been made to provide for either a splash type of lubrication or a forced feed lubrication of such bearing surfaces in piston and cylinder devices of this character. Most of the prior lubricating systems utilized in such piston and cylinder devices have, however, been considered to be objectionable either by reason of high cost of manufacture and upkeep or by reason of unreliability of the lubrication attained by such lubricating means.

In one prior attempt to afford lubrication for the piston rod bearings of a piston and cylinder device of the aforesaid character, a pulley-like oil collecting member has been provided on the crank shaft and rotatable oil transmitting means having the lower edge portion thereof disposed so as to run in the body of oil contained within the crank case has been associated with the pulley-like oil collecting member. In such prior arrangement, the rotation of the crank shaft serves to impart related rotative movement to the oil transmitting means, with the result that oil is carried by the transmitting means into the groove of the pulley like collecting member on the crank shaft, and means have been provided on the crank shaft for leading lubricant from oil collecting groove and into the lubricating passages that are provided for the piston rod bearings. In such prior devices, the structure employed for collecting the oil and conducting the same to the bearings has been relatively complicated and expensive to manufacture, and moreover, the collecting action of such structure has been relatively inefficient, with the result that proper and sufficient lubrication has not been attained in all instances. In my prior application Serial No. 642,250, filed January 19, 1946, I have disclosed lubricating structures wherein transmitting rings are arranged to transmit oil to a simplified and inexpensive oil collecting structure, and it is an important object to effect even further simplification of such lubricating means.

In my aforesaid copending application an embodiment is illustrated wherein the objectionable effect of centrifugal force in limiting or reducing the transmitting action of an oil transmitting ring is eliminated, the arrangement being such as to utilize the action of centrifugal force to retain the lubricant on the transmitting ring during the rotative movement thereof thereby to insure the elevating of a large quantity of lubricant from the bottom of the crank case, and a further and more specific object of the present invention is to utilize this elevated quantity of oil in an efficient manner and through the use of simple and inexpensive structure for collecting and applying this oil to the bearings.

Other and further objects of the present invention will be apparent from the following description and claims and are illustrated in the accompanying drawings which, by way of illustration, show a preferred embodiment, and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

Figure 1:
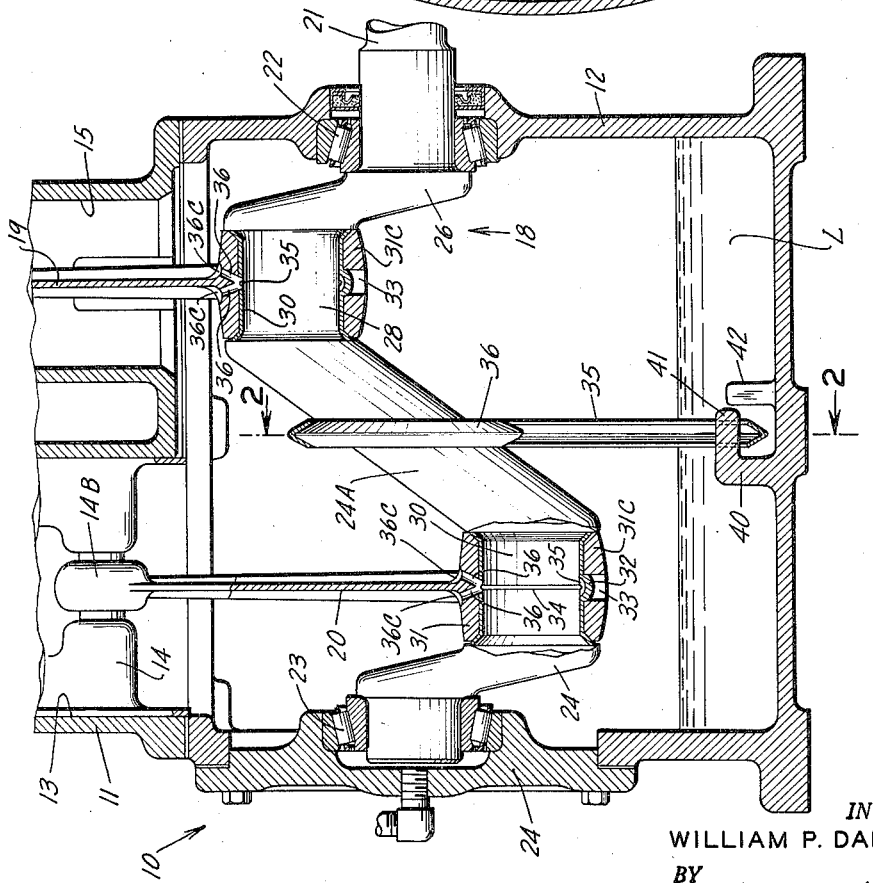

In the drawings:

Fig. 1 is a fragmental vertical sectional view through a compressor having lubricating means embodying the features of the invention, the view being taken along the line 1—1 of Fig. 2; and Fig. 2 is a fragmental vertical sectional view taken substantially along the line 2—2 of Fig. 1.

For purpose of disclosure the invention is herein illustrated as embodied in a compressor 10 having a cylinder block 11 mounted upon a crank case 12. The compressor 10 as herein shown is of the two-stage type and has its first stage provided by a cylinder 13 formed in the cylinder block 11 and having a piston 14 mounted for reciprocation therein, while the second and final stage of the compression in the compressor 10 is afforded by a cylinder 15 formed in the cylinder block 11 and having a piston (not shown) mounted for reciprocation therein. The two pistons are adapted to be reciprocated through operative connection thereof with a driven crank shaft 18 mounted in the end walls of the crank case, the desired operative connection being afforded by piston rods 19 and 20 connected respectively to the pistons. The crank shaft 18 is in the present instance driven by power means located externally of the crank case 12, and for this purpose one end 21 of the crank shaft is extended through a bearing 22 mounted in the end wall of the crank case 12, while the other end of the crank shaft is carried in a bearing 23 mounted on the inner surface of a removable access plate 24 that is secured on the other end wall of the crankcase.

The crank shaft 18, of course, is arranged with two cranks 24 and 26 and arranged for association respectively with the piston rods 19 and 20. Each of the two cranks is formed by sloping crank arms and a reduced crank pin affording a cylindrical bearing portion 28 adapted to be embraced by the appropriate bearing of the piston rod that is to be associated therewith, and it is the bearing surfaces 28 of the crank shaft that are lubricated by the lubricating system of the present invention. In attaining such lubrication of the bearing surfaces 28 of the crank shaft, means are provided for conducting lubricant from the body L thereof in the crank case 12 to the crank shaft 18 for then applying such lubricant to the bearing surfaces 28. Thus, each bearing surface 28 is embraced within a split bearing 30 disposed in the split bearing head 31 of its piston rod, and the lower half of the bearing 30 has a downwardly projecting lug 32 formed thereon so as to project into a bore 33 formed in the lower cap 31c of the bearing head 31. Thus the bearing sleeve 30 is held non-rotatively in the bearing head 31, and an oil groove 34 formed in the internal surface of the bearing sleeve 30 extends upwardly and about the bearing from a lower sump 35 formed within the upper end of the lug 32. The upper portion of the oil groove 34 communicates with a pair of upwardly extended bores 36 that open on opposite sides of the piston rod, and the upper ends of these bores 36 are enlarged as at 36C for purposes that will hereinafter become apparent. The means for conducting the lubricant from the body L to the bearings includes a transmitting ring 35 that is formed from sheet metal so as to have a V-shaped cross sectional form with the V opening inwardly. This transmitting ring 35 is arranged to ride in its upper portion on a supporting disc 36 that is formed on the crank shaft 18 substantially midway between the two bearing surfaces 28 and concentric with the rotative axis of the crankshaft. The disc 36 has its peripheral edge formed so as to be complemental to the inner V-shaped cross sectional form of the ring 35.

The lower portion of the transmitting ring 35 is arranged to extend downwardly into the body L of oil or lubricant, and this lower edge portion of the transmitting ring 35 is engaged with guiding means that prevent undesired displacement of the transmitting ring 35 while permitting rotation of the ring on and with the disc 36 as an incident to the rotation of the crank shaft 18. Thus, as disclosed in my aforesaid copending application, an upstanding retaining lug 40 is cast integrally with the bottom wall of the crank case 12, such retaining lug 40 having a horizontally extended head 41 disposed so as to extend in a direction parallel to the rotative axis of the crank shaft 18. The lug 40 is so disposed that when the transmitting ring 35 is positioned so as to ride on the disc 36, the lower edge portion of the ring 35 will be disposed in a position beneath the projecting head 41 of the lug 40. When the oil transmitting ring 35 is thus disposed with its lower portion beneath the head 41, it is held in this position by a pair of upstanding positioning lugs 42 that are formed by casting on the lower wall of the crank case 12. The positioning lugs 42 are so spaced from the lug 41 as to engage the side surfaces of the ring 35 on the side opposite from point of engagement of the lug 40 therewith, and thus the transmitting ring is held against displacement from its position beneath the head 41. The spacing of the positioning lugs 42 from the lug 41 is such that when the ring is tipped to the left in Fig. 1, the lower edge portion of the ring will be moved beyond the end of the end of the head 41 so as to release the ring from the guiding or restraining influence of the lugs 40 and 42. Thus the ring 35 may readily be placed in the desired operative association with respect to the lugs 40 and 42, this being accomplished prior to the time when the ring 35 is associated with the disc 36 on the crank shaft 18.

When the ring 35 is caused to rotate due to rotation of the crank shaft 18 the oil from the body L thereof will be carried by the ring 35 and will be held within the inside of the V by centrifugal force so as to be carried upwardly by the ring. As such oil reaches the point of juncture P of the complemental surfaces of the ring 35 and the disc 36, such oil will be forced outwardly, that is laterally of the ring 35, thereby to be thrown laterally and downwardly in the upper portion of the crankcase.

The effectiveness of the cooperating V-shaped cross sectional form in the ring 35 and the disc 36 is such that the quantity of oil thus elevated and discharged is relatively great, and as will be evident in Fig. 1, with respect to the left hand portion of the structure, this oil will be discharged in a downward lateral direction so as to strike, or to be struck by, the piston rod 20, the bearing head 31 and the downwardly extending arm portion 24A of the crank 24 that is shown in Fig. 1 as passing through the lower portion of its stroke. This impact of the rapidly moving machine parts will further distribute or throw the oil about in the upper spaces of the crank case so as to effectually lubricate the machine elements such as the bearings 23, and the wrist pin bearings 14B, and a portion of the oil which strikes the piston rod 20 and the adjacent areas defined by the enlarged upper ends 36C of the passages 36 will, during part of the rotative cycle, be centrifugally forced through the passages 36 and into the oil groove 34. Such oil will fill the groove 34 and the sump 35 so as to effectually lubricate the bearing 30.

The large volume of oil that is thus elevated and discharged laterally at the point P, Fig. 2, in the upper portion of the crankcase 12 is in part directed in its initial downward movement toward or into the enlarged open end 36C of the adjacent oil passage 36 of the piston rod head that is moving through the lower half of its stroke, and the oil that is thus trapped is, during such lower half of the stroke of the head 31, forced centrifugally into the oil groove 34 and toward the internal sump 35. Other portions of the discharged oil will of course be struck by the rapidly moving parts of the crankshaft, or will flow along the crank portions so as to be thrown at random throughout the crankcase. Such flying particles of oil will of course strike the piston rods 19 and 20 so as to run or be forced centrifugally down the rods in certain portions of the rotative cycle so as to thereby be directed in part into the passages 36.

The oil is thus forced inwardly in the passages 36 by centrifugal action during substantially the entire time that the head 31 is passing through the lower half of its cycle, and even as the head 31 moves upwardly to the top of its cycle, the oil within the passages 36 will tend to a limited degree to move downwardly within or relative to the passages 36 and the groove 34 due to the inertia of such oil, although during such upward movement in the upper portion of its cycle, there will be a reversal of the action of centrifugal forces on the oil in the passages 36. As the head 31 moves downwardly from the top point of its cycle there will of course be a reversal of the inertia forces as well as the centrifugal forces so that there will be a tendency to cause flow of the oil upwardly or outwardly of the passages 36. This tendency predominates only through a small portion of the cycle, since the centrifugal forces tending to cause inward flow become effective again at about the time when the head 31 enters the lower half of its stroke. During this short period the supply in the sump 35 is available, and by centrifugal force, will be distributed throughout the groove 34.

Thus through the cooperation of the transmitting ring of an inwardly faced V-shaped cross section, and a simple arrangement of oil entry openings formed in the piston rods themselves, the present invention enables proper lubrication of the bearings of piston rod bearings to be attained in a simple and economical manner.

Thus while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. In a piston and cylinder device, a crank case, a crank shaft mounted therein and having at least one crank, including crank arms and an intermediate crank pin, a cylinder head associated with said crank shaft and having at least one cylinder formed therein, a piston reciprocable in said cylinder, a piston rod operatively connected at its upper end to said piston and having a head at its lower end embracing said crank pin in a transmitting bearing relation thereto, means on said crank shaft affording a disc having a V-shaped outer annular surface concentric with the axis of rotation thereof and disposed adjacent to said crank pin, and an oil transmitting ring having an internal annular surface complemental in cross section to said V-shaped surface and mounted on said disc within said crank case so as to depend downwardly to a point near the bottom of said crankcase, said ring being rotatable as an incident to the rotation of said crank shaft to transmit oil from the bottom of said crank case and discharge the same laterally near the top of said disc, said head at the lower end of said piston rod having an upwardly opening oil receiving opening formed therein to receive downwardly moving portions of such laterally discharged oil.

2. In a piston and cylinder device, a crank case and a cylinder block mounted in operative association, said cylinder block having at least one cylinder formed therein, a crank shaft mounted in said crank case, a piston mounted in said cylinder, a piston rod operatively connected at its upper end to said piston and said piston rod having a connecting head at its lower end embracing a bearing crank portion of said crank shaft in power transmitting relationship, a disc formed on said crank shaft concentric to the rotative axis thereof and having a peripheral surface of an outwardly convex cross sectional form, a transmitting ring riding on said convex surface of said disc and having an internal annular surface of a cross sectional form substantially complemental to said convex surface, said ring depending from said disc toward the bottom of the crank case so that the lower portion will be disposed in the oil in the lower portion of the crank case, and means affording oil passages in said lower head of said piston rod, said passages terminating in outer inlet ends facing generally in an upward direction and leading to the associated bearing surfaces of said crank shaft and said head.

3. In a piston and cylinder device, a crank case, a crank shaft mounted therein and having at least one crank, including crank arms and an intermediate crank pin, a cylinder head associated with said crank shaft and having at least one cylinder formed therein, a piston reciprocable in said cylinder, a piston rod operatively connected at its upper end to said piston and having a head at its lower end embracing said crank pin in a transmitting bearing relation thereto, means on said crank shaft affording a disc having a V-shaped outer annular surface concentric with the axis of rotation thereof and disposed adjacent to said crank pin, and an oil transmitting ring having an internal annular surface complemental in cross section to said V-shaped surface and mounted on said disc within said crank case so as to depend downwardly to a point near the bottom of said crankcase, said ring being rotatable as an incident to the rotation of said crank shaft to transmit oil from the bottom of said crank case and discharge the same laterally near the top of said disc, said head at the lower end of said piston rod having an upwardly opening oil receiving opening formed therein to receive portions of such laterally discharged oil, said opening having the upper end thereof enlarged and extended to longitudinal surface of the rod to receive downwardly draining oil from such surface.

4. In a piston and cylinder device, a crank case, a crank shaft mounted therein and having at least one crank, including crank arms and an intermediate crank pin, a cylinder head associated with said crank shaft and having at least one cylinder formed therein, a piston reciprocable in said cylinder, a piston rod operatively connected at its upper end to said piston, said rod having a head at its lower end with a bearing sleeve fixed therein and embracing said crank pin in a transmitting bearing relation thereto, said bearing sleeve having an internal annular oil groove formed therein and also having an oil storing sump formed in the lower portion thereof and in communication with said groove, means on said crank shaft affording a disc having a V-shaped outer annular surface concentric with the axis of rotation thereof and disposed adjacent to said crank pin, and an oil transmitting ring having an internal annular surface complemental in cross section to said V-shaped surface and mounted on said disc within said crank case so as to depend downwardly to a point near the bottom of said crankcase, said ring being rotatable as an incident to the rotation of said crank shaft to transmit oil from the bottom of said crank case and discharge the same laterally near the top of said disc, said head and said sleeve having an oil receiving passage formed in the upper portions thereof to communicate with said groove and opening upwardly of said head to receive portions of such laterally discharged oil.

WILLIAM P. DALRYMPLE.

REFERENCES CITED

The following references are of record in the file of this patent:

UNITED STATES PATENTS

| Number | Name | Date |
| --- | --- | --- |
| 895,755 | Hedstrom | Aug. 11, 1908 |
| 1,620,381 | Munson | Mar. 8, 1927 |
| 1,847,418 | Steedman | Mar. 1, 1932 |